United States Patent [19]
Kaneda

[11] Patent Number: 5,141,086
[45] Date of Patent: Aug. 25, 1992

[54] CONTROLLER FOR REAR BRAKES

[75] Inventor: Naoki Kaneda, Saitama, Japan

[73] Assignee: Akebono Brake Industry Co., Ltd., Tokyo, Japan

[21] Appl. No.: 691,969

[22] Filed: Apr. 26, 1991

[30] Foreign Application Priority Data

Apr. 27, 1990 [JP] Japan .................. 2-110549

[51] Int. Cl.⁵ ............................................. B60T 8/18
[52] U.S. Cl. ..................... 188/195; 188/290; 303/2; 303/9.69; 303/22.1
[58] Field of Search .............. 303/2, 3, 9.61, 9.72, 303/13, 14, 15, 22.1, 22.2, 22.3, 22.8; 188/195

[56] References Cited

U.S. PATENT DOCUMENTS

| | | | |
|---|---|---|---|
| 3,423,134 | 1/1969 | Knapp | 303/2 |
| 3,449,017 | 6/1969 | Botterill et al. | 303/2 |
| 3,701,616 | 10/1972 | Kawai | 303/22.1 |
| 3,767,274 | 10/1973 | Gruner et al. | 303/22.1 |
| 3,904,253 | 9/1975 | Riquart | 303/22.1 |
| 3,905,651 | 9/1975 | Hornung | 303/2 |
| 3,957,313 | 5/1976 | Doversberger | 303/2 |
| 4,130,321 | 12/1978 | Fleck | 303/13 |
| 4,889,395 | 12/1989 | Fujita et al. | 303/115 R |

FOREIGN PATENT DOCUMENTS

| | | |
|---|---|---|
| 1093346 | 11/1965 | United Kingdom . |
| 1323945 | 7/1973 | United Kingdom . |
| 1344242 | 1/1974 | United Kingdom . |
| 2213890 | 8/1989 | United Kingdom . |

Primary Examiner—Robert J. Oberleitner
Assistant Examiner—Chris Schwartz
Attorney, Agent, or Firm—Finnegan, Henderson, Farabow, Garrett and Dunner

[57] ABSTRACT

A controller for rear brakes of a vehicle adapted to control a braking member in accordance with an operation of a servo circuit through which pressurized air or pressurized liquid flows, includes: a fluid retarder provided to a rotary shaft which is rotated together with the rear wheels of the vehicle; an air source for applying pressure to a working liquid in the retarder to control the braking torque thereof; a liquid pressure generator communicated with the air source for converting a pressure of the air into that of the liquid; and proportioning valve member provided between the liquid pressure generator and the brakes for imparting a predetermined restriction to the pressurized liquid that flows between the liquid pressure generator and the brakes.

7 Claims, 3 Drawing Sheets

CONTROLLER FOR REAR BRAKES

BACKGROUND OF THE INVENTION

The present invention relates to a controller for rear brakes.

A conventional controller for the rear brakes of a heavy vehicle such as an autotruck and an autobus includes a fluid retarder and a proportioning valve. The controller functions so that the fluid retarder is caused to generate braking torque at the time of the descent of the vehicle on a downhill, the slowdown of the vehicle from a high speed, or the like, to prevent the braking force of each of the rear brakes from fading due to the rise in the temperature thereof, and to enhance the safety of the vehicle and lengthen the life of the friction material of the brakes. The proportioning valve supresses the rise in braking liquid pressure of the brakes to prevent the rear wheels of the vehicle from being locked undesirably to enhance the stability of the driving of the vehicle.

The conventional controller for the rear brakes acts to cause the fluid retarder and the proportioning valve function separately from each other and not to affect each other. For that reason, when the rear brakes are put into action as the fluid retarder remains in action, the braking torque of the rear brakes is added to that of the retarder to increase the total braking torque to the rear wheels of the vehicle to possibly undesirably lock the wheels. This is a problem, especially if proportioning valve is of the load-sensitive type in which a required level or braking at which the braking liquid pressure of the rear brakes begins to be controlled is changed depending on the load on the vehicle. During operation of a conventional load-sensitive type proportioning valve, the required level differs changed depending not only on whether the vehicle is loaded or unloaded but also on changes in conditions such as the rate of the deceleration of the vehicle, to cause the retarder to generate the braking torque and to simply add it to that of the rear brakes. For that reason, the rear wheels of the vehicle are made more likely to be undesirably locked prematurely.

SUMMARY OF THE INVENTION

The present invention was made in consideration of the above-mentioned problem. Accordingly, it is an object of the present invention to provide a controller for the rear brakes of a vehicle. The controller for rear brakes of a vehicle adapted to control a braking member in accordance with an operation of a servo circuit through which pressurized air and pressurized liquid flows, includes: a fluid retarder disposed about a rotary shaft which is rotated together with the rear wheels of the vehicle; an air source for applying pressure to a working liquid in the retarder to control the braking torque thereof; a braking liquid pressure generator in communication with the air source for converting a pressure of the air into that of the braking liquid; and a proportioning valve member provided between the braking liquid pressure generator and the brakes for imparting a predetermined restriction to the pressurized braking liquid that flows between the braking liquid pressure generator and the brakes.

The controller provided for the rear brakes in accordance with the present invention functions so that when the fluid retarder is put into action during the movement of the vehicle, the pressurized air is applied from the air pressure source to the working liquid in the retarder to apply the braking torque thereof to the rotary shaft being rotated together with the rear wheels. A pneumatic-hydraulic converter converts the pressure of the pressurized air from the source into the much higher pressure of the liquid to transmit the much higher pressure to the liquid chamber of the proportioning valve. The much higher pressure acts on the piston to lower the required level of braking at which the pressure of the braking liquid applied to the rear brakes begins to be controlled. When the rear brakes are then put into action, the braking liquid pressurized in the braking liquid pressure generator is transmitted to the rear brakes around the opened member of the valve to apply braking torque to each of the rear wheels.

When the pressure of the braking liquid applied to the rear brakes causes the amount of braking to exceed the required level at which the braking liquid pressure begins to be controlled, the piston of the proportioning valve reacts to the pressure of the braking liquid so that the piston moves thereby reducing the pressure of the braking liquid at a predetermined ratio to apply the reduced pressure to the rear brakes.

The pressurized liquid is introduced into the liquid chamber of the proportioning valve to lower the required level of braking at which point the amount of braking is reduced. Thus, because of the action of the fluid retarder, the piston begins to move at a lower braking liquid pressure so that braking liquid pressure applied to the rear brakes to cause them to generate the braking torque is made lower than that shown in a braking liquid pressure rise curve obtained through the use of a conventional proportioning valve. In other words, the braking torque generated by the rear brakes through the operation of a hydraulic brake system along with the generation of the braking torque by the fluid retarder through the application of the air pressure thereto is made lower than that generated by the rear brakes through the operation of the hydraulic brake system without generation of the braking torque by the fluid retarder, depending on the magnitude of the braking torque of the retarder. For that reason, the braking torque of the retarder is not simply added to the usual braking torque of the rear brakes to apply excessive braking torque to the rear wheels to undesirably lock them prematurely. If the proportioning valve is a load-sensitive one, the required level of braking at which the braking liquid pressure begins to be controlled is chosen to correspond to an amount of braking required to prevent the rear wheels from being undesirably locked prematurely.

When the application of the pressurized air from the air pressure source to the working liquid in the fluid retarder is ceased so that the fluid retarder is put out of action, the application of the liquid pressure from the pneumatic-hydraulic converter to the liquid chamber of the proportioning valve is stopped so that the valve can operate alone without the application of the liquid pressure to the liquid chamber. The fluid retarder can also operate alone.

DETAILED DESCRIPTION OF THE PREFERRED EMBODIMENTS

An embodiment of the present invention is hereafter described with reference to the drawings attached hereto.

Figure 1:
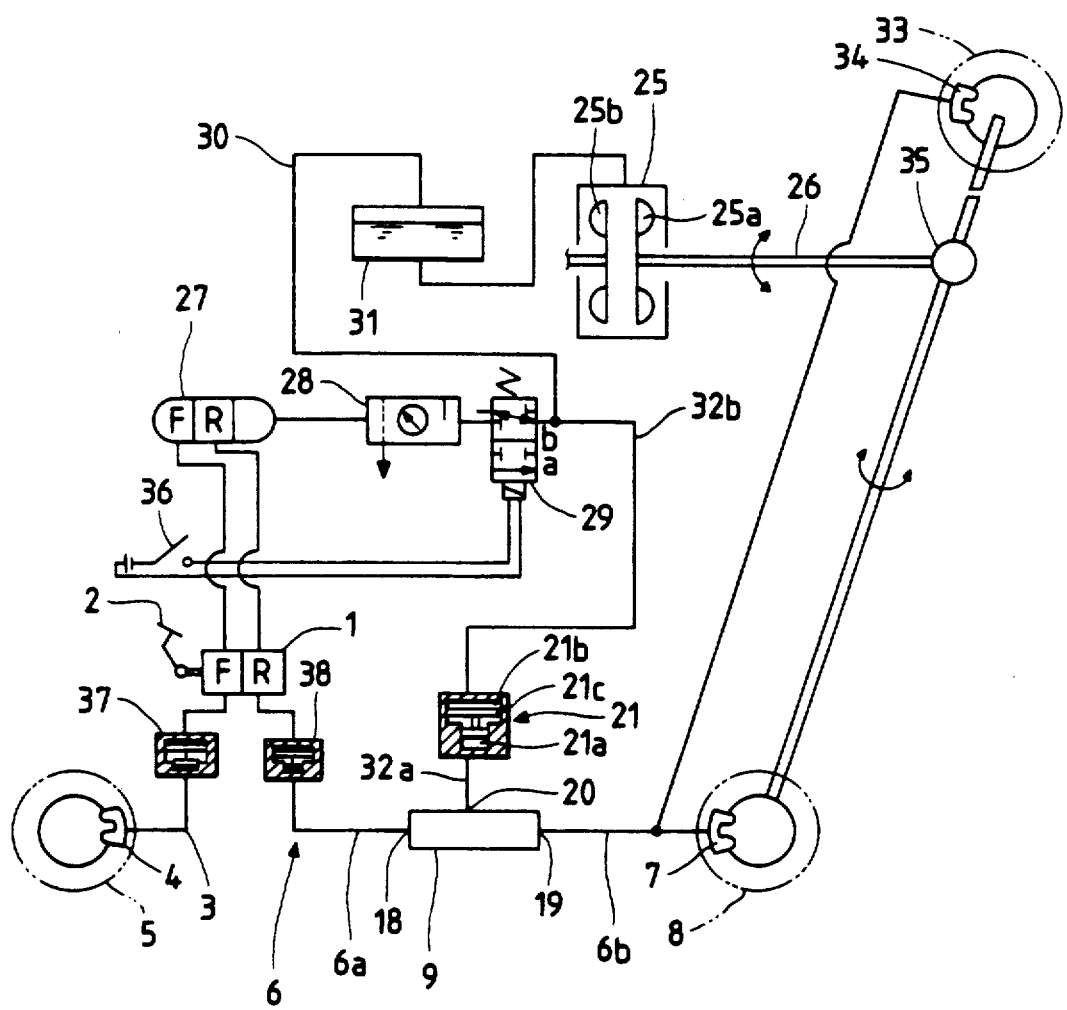
FIG. 1 is a schematic view of a controller which is for the rear brakes of a vehicle and is an embodiment of the present invention.
Figure 2:
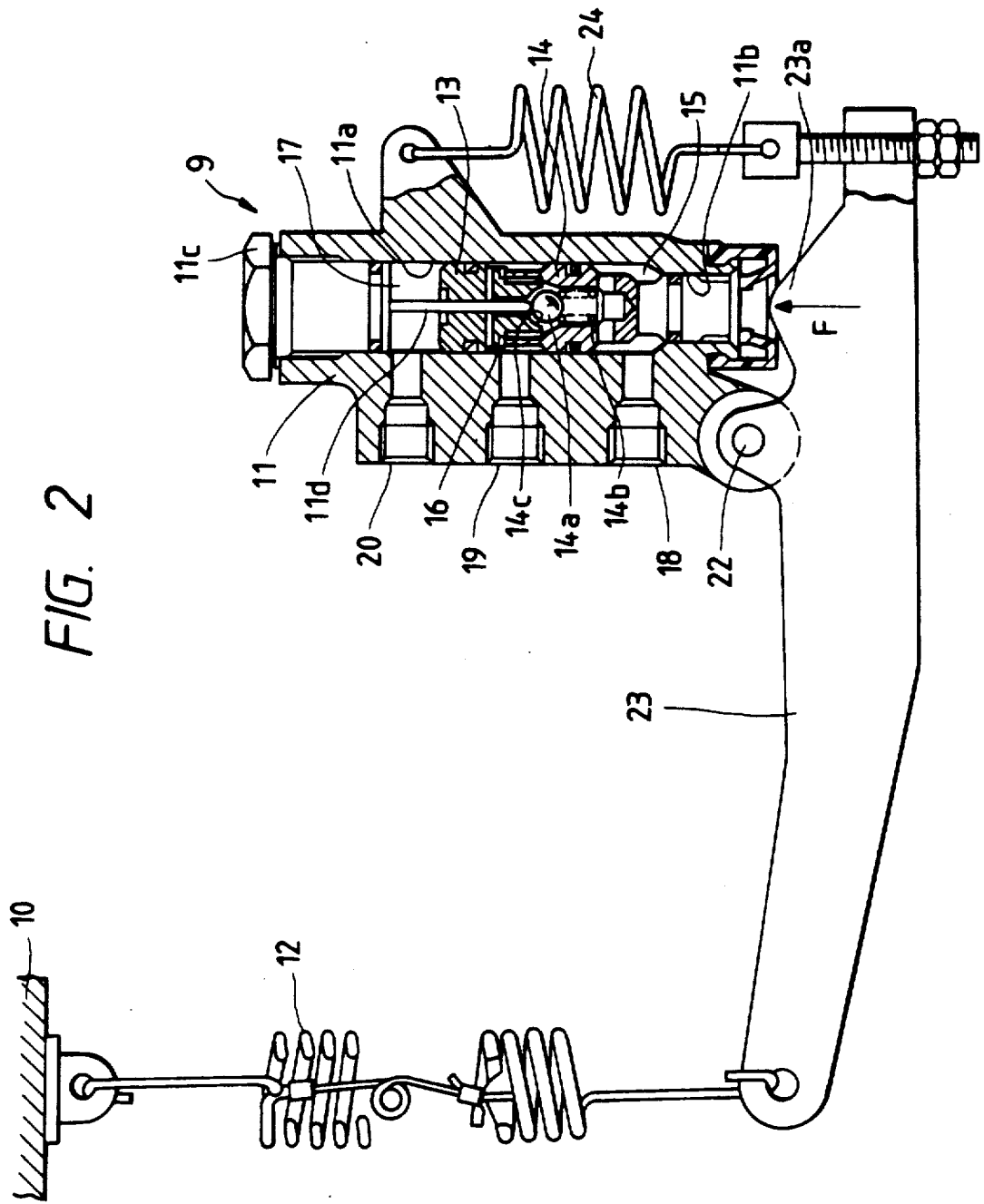
FIG. 2 is a sectional view of the load-sensitive proportioning valve of the controller.

FIGS. 1 and 2 show the preferred embodiment of a controller which is for the rear brakes 7 and 34 of a vehicle. Shown in FIG. 1 is a brake valve 1 which is shifted by the depression of a brake pedal 2 to introduce air from an air tank 27 into master air cylinders 37 and 38 which are braking liquid pressure generators. The pressure of the air in the cylinders 37 and 38 is converted into that of a braking liquid pressure by the cylinders. The pressure of the braking liquid is transmitted to a front brake 4 through a liquid passage 3 to apply braking torque to the front wheel 5 of the vehicle (only one front brake is shown in FIG. 1), and is also transmitted to the rear brakes 7 and 34 through a liquid passage 6 to apply braking torque to each of the rear wheels 8 and 33 of the vehicle.

A load-sensitive proportioning valve 9 is provided in the liquid passage 6 which is for connecting the master air cylinder 38 to the rear brakes 7 and 34. Shown also in FIG. 1 is a differential gear 35. The proportioning valve 9 is of such a type that the load on the vehicle is detected by the valve in terms of the deformation of the vehicle altering the distance between the chassis 10, which is provided over main spring 12 as shown in FIG. 2, and the axle of the vehicle, which is provided under the spring but not shown in the drawings. The casing 11 of the proportioning valve 9 is attached to the axle provided under the main spring 12. The spring 12 is loaded in tension and attached at one end thereof to the chassis 10 provided over the spring. The casing 11 has a through hole composed of a large-diameter cylinder 11a and a small-diameter cylinder 11b, and is closed at the end of the large-diameter cylinder by a plug 11c. A stepped piston 13 provided with a conventional valve member 14 is slidably fitted in the cylinders 11a and 11b so that a first liquid chamber 15 and a second liquid chamber 16, which are divided from each other by the valve member, are defined, and a third liquid chamber 17 is defined between the piston 13 and the plug 11c. The first liquid chamber 15 is connected to the master air cylinder 38 through a liquid passage 6a connected to a first port 18. The second liquid chamber 16 is connected to the wheel cylinders of the rear brakes 7 and 34 through a liquid passage 6b connected to a second port 19. The third liquid chamber 17 is connected to the liquid pressure chamber 21a of a pneumatic-hydraulic converter 21 through a pipe 32a connected to a third port 20.

A lever 23 is pivotally coupled at the intermediate portion thereof by a pin 22 to the casing 11 of the proportioning valve 9 at the end of the casing opposite the plug 11c. The lever 23 is attached at one end to the chassis 10 by the main spring 12, and urged at the other end toward the valve casing 11 by an adjusting spring 24 loaded in tension so that the jut 23a of the lever near the latter end is put in contact with the end of the piston 13 at the end of the small-diameter cylinder 11b with a force F to normally open the valve member 14.

The braking liquid pressure produced in the master air cylinder 38 by the depression of the brake pedal 2 is transmitted to the first liquid chamber 15 through the liquid passage 6a and the first port 18, around a valve member portion 14a opened in contact with a rod 11d extending to the plug 11c, and through the second port 19 and the liquid passage 6b, and then transmitted to the rear brakes 7 and 34 to apply the braking torque to each of the rear wheels 8 and 33 of the vehicle. The valve member portion 14a is pushed by the resilient force of a spring 14b so that the valve member portion is in contact with the rod 11d.

When a required level of braking at which the braking liquid pressure in the second liquid chamber 16 begins to be controlled is reached at the time of the depression of the brake pedal 2, the stepped piston 13 receives a net force downward due to the surface area difference of the portions of the piston in the first and second liquid chambers 15, 16 so that the piston is slid down with regard to FIG. 2 while swinging the lever 23. When the piston 13 moves, the valve member portion 14a no longer contacts the rod 11d and is resiliently pushed by the spring 14b so that the valve member portion is placed on a valve seat 14c. After that, in response to the creation of braking liquid pressure causing braking higher than the required level, lower braking liquid pressure is transmitted to the rear brakes 7 and 34 through the second port 19 because the surface area difference of the stepped piston 13 caused the piston to move downwardly.

When the load on the vehicle is increased, the chassis 10 provided over the main spring 12 is moved down (as shown in FIG. 1) so that the resilient force of the main spring 12 decreases and that of the adjusting spring 24 increases causing the jut 23a of the lever to exert a stronger force F an the end of the piston 13 at the end of the small-diameter cylinder 11b. Since force F has been increased, the prescribed level of braking at which the braking liquid pressure begins to be controlled as the piston 13 is operated in response to the braking liquid pressure in the rear brakes 7 and 34 is heightened. As a result, the required level of braking at which the braking liquid pressure is connected is higher for a loaded vehicle. Therefore, a higher braking liquid pressure is applied to the rear brakes 7 and 34 than if the vehicle load were not increased, so that higher braking torque is usually generated.

When the pressurized liquid is introduced into the third liquid chamber 17 of the load-sensitive proportioning valve 9, the force F which is applied to the end of the piston 13 at the end of the small-diameter cylinder 11b is opposed by the pressure of the liquid. At that time, the required level of braking at which the braking liquid pressure begins to be controlled is lowered because of the opposition to the force F by the liquid in the third liquid chamber, so that braking liquid pressure is applied to the rear brakes 7 and 34 similarly to when the load on the vehicle is decreased.

When the vehicle has undergone deceleration, the distance between the chassis 10 and the valve casing 11 increases and the lever 23 is strongly pulled by the main spring 12 so that the same operation is performed as the case that the load on the vehicle is decreased.

The fluid retarder 25 is attached to the drive shaft 26 of the vehicle, and has such conventional constitution and operation that the retarder includes a stator 25a secured to the chassis 10 so as to be unrotatable, an impeller 25b capable of being coupled to the drive shaft so as to be rotated, and a liquid which is oil or water provided between the stator and the impeller so as to convert kinetic energy into thermal energy to generate the braking torque. Pressurized air can be applied from an air pressure source such as the air tank 27 to the retarder 25 to control the braking torque thereof. The pressurized air is sent from the air tank 27 to a changeover valve 29 while the pressure of the air is regulated down from a level of 4 to 7 kgf/cm$^2$ in the tank to a level of 2 kgf/cm$^2$, for example, by a pressure control valve 28. The changeover valve 29 is put in a position a or another b. When a retarder switch 36 is turned on so that the changeover valve 29 is put in the position a, some of the pressurized air having its pressure regulated by the pressure control valve 28 is conducted to a pipe 30 through the changeover valve to exert pressure on the working liquid stored in a reservoir tank 31, and the other of the air is conducted to the air chamber 21b of the pneumatic-hydraulic converter 21 through a pipe 32b. When the retarder switch 36 is turned off so that the changeover valve 29 is put in the other position b, the pressurized air is kept from being conducted from the pressure control valve 28 into the pipes 30 and 32b, and the pressurized air in the reservoir discharged to the atmosphere.

The pneumatic-hydraulic converter 21 includes a small-diameter liquid pressure chamber 21a, a large-diameter air pressure chamber 21b, and a piston 21c having a small-diameter portion and a large-diameter portion which are slidably fitted in the chambers. When the pressurized air is introduced into the air chamber 21b, the piston 21c is slid down with regard to FIG. 1 so that the pressure of the liquid in the liquid pressure chamber 21a is very much heightened.

The fluid retarder 25 is not confined to being attached to the propeller shaft 26, but may be attached to another rotary shaft such as the axle or a shaft in an automatic transmission, which is rotated together with the rear wheels 8 and 33.

The operation of the controller for the rear brakes 7 and 34 will now be described in greater detail. When the retarder switch 36 is turned on, that the impeller 25b is coupled to the propeller shaft 26 by a clutch and the changeover valve 29 is put in the position a by an energized solenoid. Some of the pressurized air in the air tank 27, the pressure in which fluctuates, is sent to the reservoir tank 31 through the pipe 30, and some of the air is sent to the air chamber 21b of the pneumatic-hydraulic converter 21 through the pipe 32b. While the pressure of the air is regulated by the pressure control valve 28. The pressurized air sent to the reservoir tank 31 exerts pressure on the working liquid stored in the tank, so that the retarder 25 is caused to generate an amount of braking torque, the level of which corresponds to the pressure of the air. The pressurized air sent to the air chamber 21b of the converter 21 increases the pressure of the liquid in the liquid pressure chamber 21a thereof. The increased pressure of the liquid is transmitted to the third liquid chamber 17 of the load-sensitive proportioning valve 9 through the pipe 32a, the pressure exerting a force on the piston 13 opposing force F so that the resilient force of the main spring 12 for the valve is reduced. When the brake pedal 2 is then depressed, the braking liquid is pressurized in the master air cylinders 37 and 38 and is transmitted to the front brake 4 through the liquid passage 3 to apply the braking torque to the front wheel 5. The braking liquid is also transmitted to the first liquid chamber 15 of the proportioning valve 9 through the liquid passage 6a, around the valve member portion 14a opened in contact with the rod 11d, through the second port 19, and then to the rear brakes 7 and 34 to apply the braking torque to each of the rear wheels 8 and 33.

When the required level of braking at which the braking liquid pressure in the second liquid chamber 16 for the rear brakes 7 and 34 begins to be controlled is reached by the pressure of the braking liquid at the time of the depression of the brake pedal 2, the braking liquid pressure acts on the piston 13 to slide it down with regard to FIG. 2, and the valve member portion 14a ceases to contact the rod 11d and is placed on the valve seat 14c. As for the braking liquid pressure not lower than the required level, the lower braking liquid pressure is transmitted to the rear brakes 7 and 34 through the second port 19 depending on the liquid pressure reception area difference of the stepped piston 13. Since the pressurized liquid is already introduced into the third liquid chamber 17, the operation of the proportioning valve 9 becomes similar to that in the case of the decrease in the force F on the piston 13 at the end of the small-diameter cylinder 11b so that the required level at which the braking liquid pressure beings to be controlled is lowered. As a result, the braking liquid pressure operating on the rear brakes 7 and 37 while the retarder 25 is operating is apparently equal to that in the case that the load on the vehicle is smaller is introduced into the rear brakes. The pressurized liquid is transferred from the liquid pressure chamber 21a of the pneumatic-hydraulic converter 21 to the third liquid chamber 17 along with the sliding of the piston 13.

The braking torque generated by each of the rear brakes 7 and 34 through the operation of a hydraulic braking system is made smaller than the usual braking torque generated by the rear brake through the depression of the brake pedal 2 by an amount depending on the level of the air pressure acting to the reservoir tank 31 for the fluid retarder 25, namely, on the level of the braking torque generated by the retarder. For that reason, the braking torque generated by the fluid retarder 25 is not simply added to the usual braking torque generated by the rear brakes 7 and 34 through the depression of the brake pedal 2, to apply excessive braking torque to the rear wheels 8 and 33 to undesirably lock them prematurely.

When the load on the vehicle is increased, the chassis 10 is moved down so that the resilient force of the adjusting spring 24 increases to intensify the force F keeping the jut 23a of the lever 23 in contact with the piston 13 at the end of the small-diameter cylinder 11b. As a result, the required level of braking at which the braking liquid pressure begins to be controlled so that the braking liquid pressure moves the piston 13 is heightened so that braking liquid of higher pressure is introduced into the rear brakes 7 and 34 than before the load on the vehicle was increased.

Figure 3:
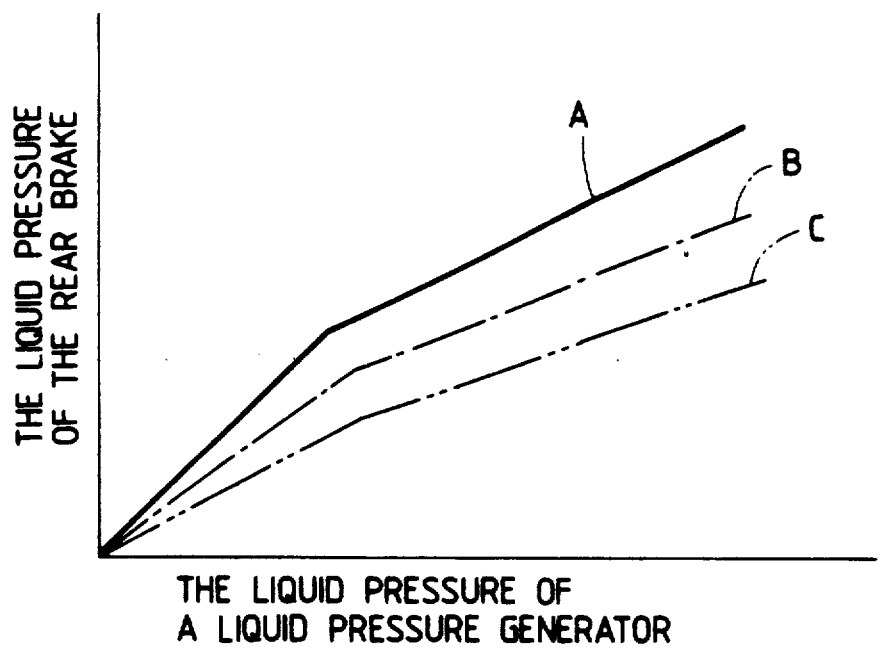
FIG. 3 is a graph indicating the relationship between the liquid pressure of the rear brake and that of a liquid pressure generator.

FIG. 3 shows the relationship between the liquid pressure in the master air cylinder and that in the rear brake in the case of the generation of prescribed braking torque to the vehicle under the same load. A full line A in FIG. 3 indicates the relationship in the use of a conventional controller including a conventional load-sensitive proportioning valve. A one-dot chain line B in FIG. 3 indicates the relationship in the use of the embodiment of the present invention and the application of the pressurized air of relatively low pressure to the reservoir tank 31 and the air chamber 21b of the pneumatic-hydraulic converter 21. A two-dot line C in FIG. 3 indicates the relationship in the use of the embodiment of the present invention and the application of the pressurized air of relatively high pressure to the reservoir tank 31 and the air chamber 21b of the pneumatic-hydraulic converter 21. It is understood from FIG. 3 that the braking torque is generated by the fluid retarder 25 depending on the pressure of the pressurized air in the air chamber 21b of the pneumatic-hydraulic converter 21, to suppress the rise in the braking liquid pressure in the rear brakes 7 and 34 depending on the braking torque, to set the total braking torque of the vehicle at a prescribed level. The relationship shown in FIG. 3 is obtained when the fluid retarder is put into action nearly at the same time as the depression of the brake pedal.

When the retarder switch 36 is turned off so that the impeller 25b is uncoupled from the propeller shaft 26 and the changeover valve 29 is put in the position b by a spring, the pipes 30 and 32b are opened to the atmosphere so that the exertion of the pressure on the working liquid in the reservoir tank 31 is ceased, the fluid retarder 25 is put out of action, the piston 21c of the pneumatic-hydraulic converter 21 is returned by the adjusting spring 24, and the application of the pressurized liquid to the third liquid chamber 17 of the load-sensitive proportioning valve 9 is ceased. The proportioning valve thus can operate alone without the application of the pressurized liquid to the third liquid chamber. The fluid retarder 25 can also operate alone.

A controller provided for the rear brakes of a vehicle in accordance with the present invention functions so that a required level of braking at which the pressure of a braking liquid begins to be controlled by a load-sensitive proportioning valve is changed depending on the level of the pressure of air applied from an air pressure source to a working liquid to operate a fluid retarder, namely, depending on the magnitude of the braking torque of the retarder, to reduce braking torque generated by a brake through use of braking liquid pressure produced by a liquid pressure generator as the brake is put in action. For that reason, the braking torque generated by the brake through use of the braking liquid pressure produced by the liquid pressure generator is not simply added to that of the fluid retarder to undesirably lock the rear wheels of the vehicle prematurely. A practical effect is thus produced.

What is claimed is:

1. A controller for brakes applied to rear wheels of a vehicle comprising:
   a fluid retarder for creating braking torque and disposed about a rotary shaft linked for rotation with the rear wheels of the vehicle, said retarder containing working liquid;
   an air source for applying air pressure to said working liquid to control said braking torque;
   a braking liquid pressure generator containing braking liquid and in communication with said air source for applying air pressure to said braking liquid;
   proportioning valve means provided between and in communication with said braking liquid pressure generator and the brakes for imparting a predetermined restriction to the flow of braking liquid between said braking liquid pressure generator and the brakes; and
   a pneumatic-hydraulic converter containing an adjusting liquid and being in communication with said air source and said proportioning valve means, said pneumatic-hydraulic converter being adapted to convert the pressure of said air source to a higher pressure of said adjusting liquid transmitted to said proportioning valve means to alter said predetermined restriction.

2. A controller for brakes applied to rear wheels of a vehicle as in claim 1, wherein said proportioning valve means comprises:
   a casing; and
   a piston having a valve member and slidably disposed within said casing, said casing having first and second liquid chambers separated by said valve member, and a third liquid chamber separated from said second liquid chamber by said piston, said first liquid chamber being in communication with said braking liquid pressure generator, said second liquid chamber being in communication with the brakes, and said third liquid chamber being in communication with said pneumatic-hydraulic converter.

3. A controller for brakes applied to rear wheels of a vehicle as in claim 2, the pressure of said braking liquid causes said piston to slide relative to said casing upon the exceeding of a predetermined level of braking thereby operating said valve member to reduce the pressure of said braking liquid applied to the brakes at a predetermined ratio, said third liquid chamber for receiving said adjusting liquid for altering said predetermined restriction.

4. A controller for brakes applied to rear wheels of a vehicle as in claim 1, further comprising a vehicle load sensor contacting said proportioning valve means, said vehicle load sensor reacting to changes in the load upon the vehicle to alter said predetermined restriction.

5. A controller for brakes applied to rear wheels of a vehicle comprising:
   a fluid retarder for creating braking torque and disposed about a rotary shaft linked for rotation with the rear wheels of the vehicle, said retarder containing working liquid;
   an air source for applying air pressure to said working liquid to control said braking torque;
   a braking liquid pressure generator containing braking liquid and in communication with said air source for applying air pressure to said braking fluid;
   a braking liquid passage connecting said braking fluid pressure generator and the brakes;
   a proportioning valve provided within said braking liquid passage and including a casing and a piston slidably disposed within said casing, said piston and said casing defining a chamber within said casing and said piston including a valve member, the pressure of said braking liquid causing said piston to slide relative to said casing upon the exceeding of a predetermined level of braking thereby operating said valve member to reduce the pressure of said braking liquid applied to the brakes at a determined ratio, said chamber receiving a pressurized adjusting liquid for altering said predetermined level of braking; and
   a vehicle load sensor contacting said piston, said vehicle load sensor reacting to changes in the load upon the vehicle to alter said predetermined level of braking.

6. A controller for brakes applied to rear wheels of a vehicle comprising:
   a fluid retarder for creating braking torque and disposed about a rotary shaft linked for rotation with the rear wheels of the vehicle, said retarder containing working liquid;

an air source for applying air pressure to said working liquid to control said braking torque;

a braking liquid pressure generator containing braking liquid and in communication with said air source for applying air pressure to said braking fluid;

a braking liquid passage connecting said braking liquid pressure generator and the brakes;

a proportioning valve provided within said braking liquid passage and including a casing and a piston slidably disposed within said casing, said piston and said casing defining a chamber within said casing and said piston including a valve member, the pressure of said braking liquid causing said piston to slide relative to said casing upon the exceeding of a predetermined level of braking thereby operating said valve member to reduce the pressure of said braking liquid applied to the brakes at a predetermined ratio, said chamber receiving a pressurized adjusting liquid for altering said predetermined level of braking; and a pneumatic-hydraulic converter in communication with said air source and said chamber of said proportioning valve, said pneumatic-hydraulic converter being adapted to convert the pressure of said air source to a higher pressure of said adjusting liquid.

7. A controller for brakes applied to rear wheels of a vehicle comprising:

a fluid retarder for creating braking torque and disposed about a rotary shaft rotated together with the rear wheels of the vehicle, said retarder containing working liquid;

an air source for applying air pressure to said working liquid to control said braking torque;

a braking liquid pressure generator containing braking liquid and in communication with said air source for applying air pressure to said braking liquid;

a braking liquid passage connecting said braking liquid pressure generator and the brakes;

a proportioning valve provided within said braking liquid passage and including a casing and a piston slidably disposed within said casing, said piston and said casing defining a chamber within the casing and said piston including a valve member, the pressure of said braking liquid causing said piston to slide relative to said casing upon the exceeding of a predetermined level of braking thereby operating said valve member to reduce the pressure of said braking liquid applied to the brakes at a predetermined ratio, said chamber for receiving a pressurized adjusting liquid for altering said predetermined level of braking;

a pneumatic-hydraulic converter in communication with said air source and said chamber of said proportioning valve, said pneumatic-hydraulic converter being adapted to convert the pressure of said air source to a higher pressure of said adjusting liquid;

a vehicle load sensor contacting said proportioning valve, said vehicle load sensor reacting to changes in the load upon the vehicle to alter said predetermined level of braking.

* * * * *

UNITED STATES PATENT AND TRADEMARK OFFICE
CERTIFICATE OF CORRECTION

PATENT NO. : 5,141,086
DATED : August 25, 1992
INVENTOR(S) : Naoki Kaneda

It is certified that error appears in the above-identified patent and that said Letters Patent is hereby corrected as shown below:

Claim 5, column 8, line 57, change "determined" to --predetermined--.

Signed and Sealed this

Twenty-sixth Day of October, 1993

Attest:

BRUCE LEHMAN

Attesting Officer

Commissioner of Patents and Trademarks